(12) United States Patent
Nakajima

(10) Patent No.: US 10,002,315 B2
(45) Date of Patent: Jun. 19, 2018

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Satoru Nakajima, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/417,996

(22) Filed: Jan. 27, 2017

(65) Prior Publication Data

US 2017/0220910 A1 Aug. 3, 2017

(30) Foreign Application Priority Data

Feb. 2, 2016 (JP) .................................. 2016-018131

(51) Int. Cl.
*H04N 1/04* (2006.01)
*G06K 15/02* (2006.01)
*G06F 3/12* (2006.01)

(52) U.S. Cl.
CPC ....... *G06K 15/1819* (2013.01); *G06F 3/1204* (2013.01); *G06F 3/1207* (2013.01);
(Continued)

(58) Field of Classification Search
CPC ....... H04N 2201/0094; H04N 1/00204; H04N 2201/0039; H04N 1/00127; H04N 1/00244; H04N 1/00307; H04N 1/00482; H04N 1/2187; H04N 1/4413; H04N 1/00413; H04N 1/32101; H04N 2201/001; H04N 1/00347
(Continued)

(56) References Cited

U.S. PATENT DOCUMENTS 7,751,628 B1* 7/2010 Reisman .............. G11B 27/034
382/232
8,547,566 B2* 10/2013 Isshiki .................. G06F 3/1203
358/1.14

(Continued)

FOREIGN PATENT DOCUMENTS

JP 2008-165529 A 7/2008
JP 2009-075976 A 4/2009
(Continued)

*Primary Examiner* — Negussie Worku
(74) *Attorney, Agent, or Firm* — Canon U.S.A., Inc. IP Division

(57) ABSTRACT

There is provided an image forming apparatus including a display, a storage unit, an image forming unit, and a control unit. The control unit is configured to perform acquiring bibliographic information about a plurality of print data including the first print data and the second print data, and then displaying a print data selection screen on the display unit based on the bibliographic information so that an instruction to select the print data based on which the image forming unit forms the image can be issued, determining that the first print data can be acquired from the external apparatus and bringing the selection screen into a first display state, and determining that the first print data cannot be acquired from the external apparatus and bringing the selection screen into a second display state.

13 Claims, 25 Drawing Sheets

(52) U.S. Cl.
CPC .......... *G06F 3/1222* (2013.01); *G06F 3/1231* (2013.01); *G06F 3/1238* (2013.01); *G06F 3/1256* (2013.01); *G06F 3/1258* (2013.01); *G06F 3/1267* (2013.01); *G06F 3/1285* (2013.01)

(58) Field of Classification Search
USPC .... 358/1.15, 1.13, 1.14, 1.18, 1.9, 1.1, 1.11, 358/1.16, 1.6; 709/203, 217, 218, 219, 709/223, 224
See application file for complete search history.

(56) References Cited

U.S. PATENT DOCUMENTS

| | | | | |
|---|---|---|---|---|
| 8,867,051 | B2 * | 10/2014 | Morii | G06K 15/1817 358/1.13 |
| 9,646,451 | B2 * | 5/2017 | Blust | G06Q 10/087 |
| 2005/0068566 | A1 * | 3/2005 | Nishiguchi | G06F 3/1204 358/1.15 |
| 2007/0165275 | A1 * | 7/2007 | Lizuka | G06F 3/1204 358/1.15 |
| 2009/0109450 | A1 * | 4/2009 | Shino | B41J 2/155 358/1.8 |
| 2010/0245909 | A1 * | 9/2010 | Yamaguchi | G06F 3/1204 358/1.15 |
| 2012/0148323 | A1 * | 6/2012 | Shimada | G06F 3/1204 400/76 |
| 2013/0088738 | A1 * | 4/2013 | Tajima | G06F 3/1204 358/1.14 |
| 2013/0155454 | A1 * | 6/2013 | Saitoh | G06F 3/1296 358/1.15 |
| 2013/0222829 | A1 * | 8/2013 | Nakashima | G06F 3/1204 358/1.13 |
| 2015/0055187 | A1 * | 2/2015 | Nagano | H04N 1/32 358/401 |
| 2016/0019013 | A1 * | 1/2016 | Ido | G06F 3/1286 358/1.15 |
| 2016/0023492 | A1 * | 1/2016 | Shinkai | B41J 29/38 347/110 |

FOREIGN PATENT DOCUMENTS

| | | |
|---|---|---|
| JP | 2013-033443 A | 2/2013 |
| JP | 2014-148064 A | 8/2014 |

* cited by examiner

FIG. 8

UserA:

| DATE | IP ADDRESS | STORAGE LOCATION | PRINT JOB NAME | PRINT SETTING |
|---|---|---|---|---|
| 2015/4/10 10:34:45 | 192.168.2.11 | /data/0015/xxx | AAA.txt | ONE-SIDED ONE PRINT COPY MONOCHROME |
| 2015/4/20 13:50:22 | 192.168.2.11 | /data/0591/yyy | BBB.pdf | TWO-SIDED THREE PRINT COPIES COLOR |
| 2015/5/28 14:10:00 | 192.168.2.11 | /data/8125/zzz | CCC.doc | TWO-SIDED FIVE PRINT COPIES 2in1 COLOR |

FIG. 13

PRINT

SELECT JOB.

1301

| JOB NAME/PRINT SETTING | DATE | USER NAME |
|---|---|---|
| AAA.txt<br>ONE-SIDED ONE PRINT COPY MONOCHROME | 2015/4/10 10:34:45 | UserA |
| BBB.pdf<br>TWO-SIDED THREE PRINT COPIES COLOR | 2015/4/20 13:50:22 | UserA |
| CCC.doc<br>TWO-SIDED FIVE PRINT COPIES 2in1 COLOR | 2015/5/28 14:10:00 | UserA |

SELECTED NUMBER:0  □ SELECT ALL
TOTAL:5

[SET PRINT] [DISPLAY IMAGE] [DELETE JOB]        [START PRINT]

FIG. 18

User A:

| DATE | IP ADDRESS | STORAGE LOCATION | PRINT JOB NAME | PRINT SETTING | PRINTABLE STATE |
|---|---|---|---|---|---|
| 2015/4/10 10:34:45 | 192.168.2.11 | /data/0015/xxx | AAA.txt | ONE-SIDED ONE PRINT COPY MONOCHROME | NG |
| 2015/4/20 13:50:22 | 192.168.2.12 | /data/0591/yyy | BBB.pdf | TWO-SIDED THREE PRINT COPIES COLOR | OK |
| 2015/5/28 14:10:00 | 192.168.2.13 | /data/8125/zzz | CCC.doc | TWO-SIDED FIVE PRINT COPIES 2in1 COLOR | OK |

○ PRINT

SELECT JOB.

| | JOB NAME/PRINT SETTING | DATE | USER NAME |
|---|---|---|---|
| NG | AAA.txt<br>ONE-SIDED ONE PRINT COPY MONOCHROME | 2015/4/10 10:34:45 | UserA |
| OK | BBB.pdf<br>TWO-SIDED THREE PRINT COPIES COLOR | 2015/4/20 13:50:22 | UserA |
| OK | CCC.doc<br>TWO-SIDED FIVE PRINT COPIES 2in1 COLOR | 2015/5/28 14:10:00 | UserA |

SELECTED NUMBER:0  ☐ SELECT ALL
TOTAL:5

[SET PRINT] [DISPLAY IMAGE] [DELETE JOB] [START PRINT]

FIG. 21A

○ PRINT

SELECT JOB.

| JOB NAME/PRINT SETTING | DATE | USER NAME |
|---|---|---|
| | | 2001 |
| AAA.txt ONE-SIDED ONE PRINT COPY MONOCHROME | 2015/4/10 10:34:45 | UserA |
| BBB.pdf TWO-SIDED THREE PRINT COPIES COLOR | 2015/4/20 13:50:22 | UserA |
| CCC.doc TWO-SIDED FIVE PRINT COPIES 2in1 COLOR | 2015/5/28 14:10:00 | UserA |

SELECTED NUMBER:0    ☐ SELECT ALL
TOTAL:5

[SET PRINT] [DISPLAY IMAGE] [DELETE JOB] [START PRINT]

FIG. 21B

◯ PRINT

SELECT JOB.

| | JOB NAME/PRINT SETTING | DATE | USER NAME |
|---|---|---|---|
| 192.168.2.11 OFFLINE | AAA.txt ONE-SIDED ONE PRINT COPY MONOCHROME | 2015/4/10 10:34:45 | UserA |
| 192.168.2.12 ONLINE | BBB.pdf TWO-SIDED THREE PRINT COPIES COLOR | 2015/4/20 13:50:22 | UserA |
| LOCAL | CCC.doc TWO-SIDED FIVE PRINT COPIES 2in1 COLOR | 2015/5/28 14:10:00 | UserA |

SELECTED NUMBER:0  ☐ SELECT ALL
TOTAL:5

[SET PRINT]  [DISPLAY IMAGE]  [DELETE JOB]  [START PRINT]

FIG. 21C

○ PRINT

SELECT JOB.                                                                           2001

| JOB NAME/PRINT SETTING | DATE | USER NAME |
|---|---|---|
| BBB.pdf<br>TWO-SIDED THREE PRINT COPIES COLOR | 2015/4/20 13:50:22 | UserA |
| CCC.doc<br>TWO-SIDED FIVE PRINT COPIES 2in1 COLOR | 2015/5/28 14:10:00 | UserA |

SELECTED NUMBER:0  ☐ SELECT ALL
TOTAL:5

[SET PRINT] [DISPLAY IMAGE] [DELETE JOB]                    [START PRINT]

FIG. 22A

PRINT (APPARATUS)

SELECT JOB.

| | JOB NAME/PRINT SETTING | DATE | USER NAME |
|---|---|---|---|
| OK | ccc.doc TWO-SIDED FIVE PRINT COPIES 2in1 COLOR | 2015/5/28 14:10:00 | UserA |

SELECTED NUMBER:0
TOTAL:5

☐ SELECT ALL

[SET PRINT] [DISPLAY IMAGE] [DELETE JOB]    [START PRINT]

FIG. 22B

○ PRINT (ANOTHER APPARATUS)

SELECT JOB.                                                    2001

| | JOB NAME/PRINT SETTING | DATE | USER NAME |
|---|---|---|---|
| NG | AAA.txt<br>ONE-SIDED ONE PRINT COPY MONOCHROME | 2015/4/10 10:34:45 | UserA |
| OK | BBB.pdf<br>TWO-SIDED THREE PRINT COPIES COLOR | 2015/4/20 13:50:22 | UserA |

2002

SELECTED NUMBER:0   ☐ SELECT ALL
TOTAL:5

[SET PRINT] [DISPLAY IMAGE] [DELETE JOB]            [START PRINT]

IMAGE FORMING APPARATUS, METHOD FOR CONTROLLING IMAGE FORMING APPARATUS, AND STORAGE MEDIUM

BACKGROUND OF THE INVENTION

Field of the Invention

The present invention relates to an image forming apparatus, a control method, and a storage medium storing a program.

Description of the Related Art

Conventionally, in a printing apparatus (image forming apparatus), printing (image formation) has been performed on a sheet based on print data. One of usage forms of the image forming apparatus is a usage form in which received print data is not printed on the spot but stored and managed using bibliographic information. In this usage form, a user selects, from among print data stored in the image forming apparatus, the print data to be printed and issues an instruction to start printing. In this usage form, the user can issue an instruction to start printing at any timing and receive a print product on the spot.

Furthermore, in recent years, an image forming system, in which print data stored in an external apparatus is downloaded and printed, has appeared as a network technique has been developed.

A system discussed in Japanese Patent Application Laid-Open No. 2013-33443 includes a plurality of image forming apparatuses storing print data, and a bibliographic server that can manage bibliographic information about the print data stored in each of the image forming apparatuses. When printing is performed using this system, the image forming apparatus operated by a user first acquires the bibliographic information from the bibliographic server and displays a print data selection screen. When the user operates the selection screen to select the print data, the image forming apparatus downloads the selected print data from another image forming apparatus, and starts to print the downloaded print data.

However, in an image forming system in which an acquisition source of bibliographic information and an acquisition source of print data differ from each other, like discussed in Japanese Patent Application Laid-Open No. 2013-33443, the following issue occurs in a situation where the bibliographic information can be acquired but the print data cannot be acquired. The issue is that a print data selection screen is displayed based on bibliographic information acquired from the bibliographic server so that print data, which cannot be acquired, is displayed as if it was printable. Particularly, lining-up on the selection screen of identification information about acquirable print data and identification information about unacquirable print data is inconvenient for a user.

Thus, an image forming apparatus desirably displays the acquirable print data and the unacquirable print data to be easily distinguishable when the respective pieces of identification information about the print data are displayed in a list.

SUMMARY OF THE INVENTION

The present invention is directed to an image forming apparatus capable of distinguishing between acquirable print data and unacquirable print data.

According to an aspect of the present invention, an image forming apparatus capable of communicating with an external apparatus storing first print data, includes a display unit configured to display information for a user, a storage unit configured to store second print data, an image forming unit configured to form an image on a sheet based on print data, and a control unit configured to perform processing for acquiring bibliographic information about a plurality of print data including the first print data and the second print data, and then displaying a print data selection screen on the display unit based on the bibliographic information so that an instruction to select the print data based on which the image forming unit forms the image can be issued, processing for determining that the first print data can be acquired from the external apparatus and bringing the selection screen into a first display state, and processing for determining that the first print data cannot be acquired from the external apparatus and bringing the selection screen into a second display state.

Further features of the present invention will become apparent from the following description of exemplary embodiments with reference to the attached drawings.

BRIEF DESCRIPTION OF THE DRAWINGS

FIG. 8 is a table illustrating an example of a bibliographic information list stored in a hard disk drive (HDD).

FIG. 13 illustrates an example of a screen on which a print job list is displayed.

FIG. 18 is a table illustrating an example of a bibliographic information list.

FIG. 20 illustrates an example of a screen.

FIGS. 21A, 21B, and 21C respectively illustrate modified examples of a printable display.

FIGS. 22A and 22B respectively illustrate modified examples of a job list display.

DESCRIPTION OF THE EMBODIMENTS

A first exemplary embodiment of the present invention will be described below with reference to the drawings.

The present exemplary embodiment presupposes an image forming system in which an image forming apparatus to be operated to print data stored in another image forming apparatus. A case where the image forming apparatus notifies, when it cannot acquire the print data stored in the other image forming apparatus, a user that the print data cannot be acquired, will be described.

Figure 1:
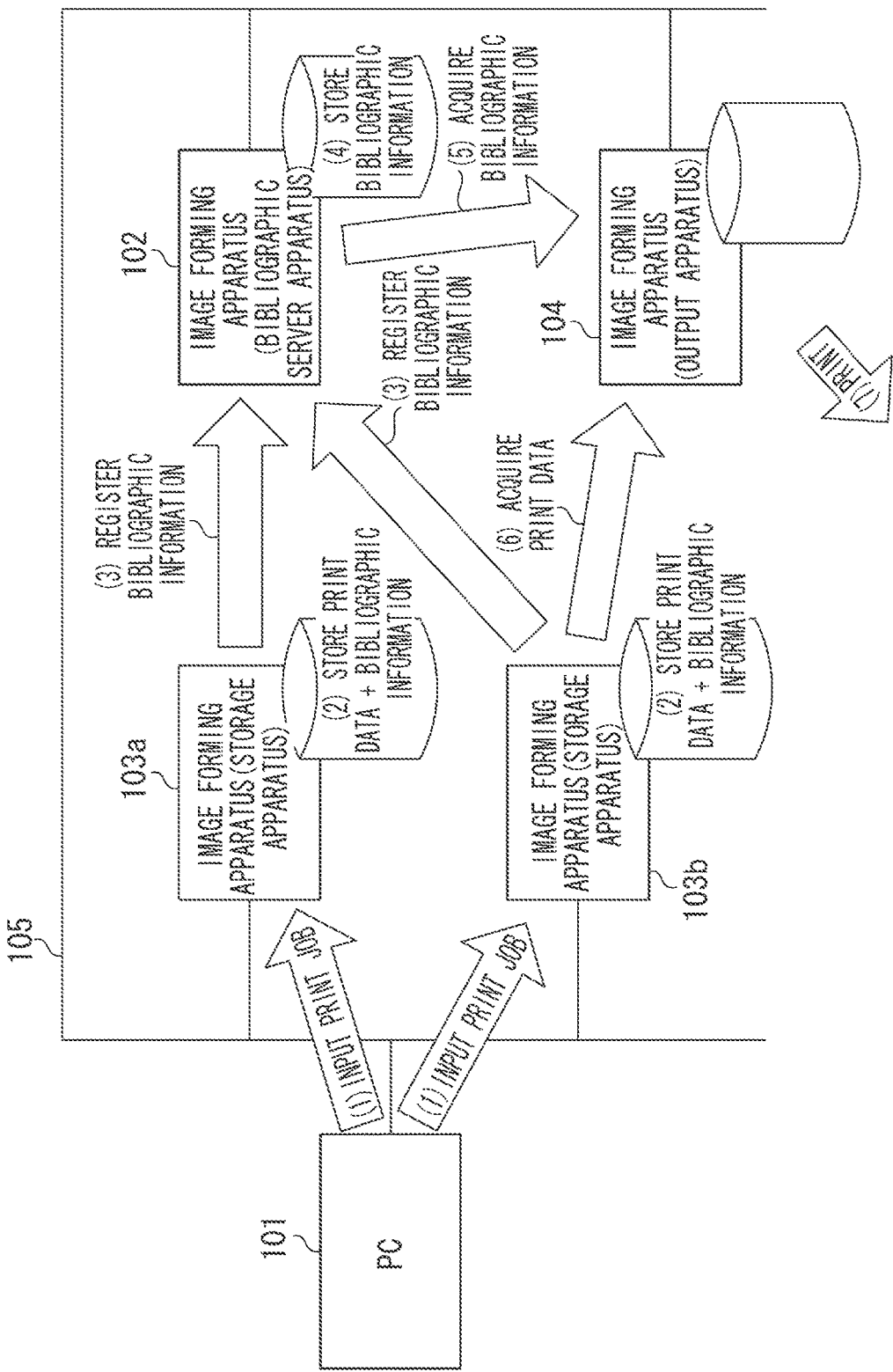
FIG. 1 illustrates an example of a system configuration of a printing system.

FIG. 1 illustrates an example of a system configuration of a printing system. The printing system includes a personal computer (PC) 101 that can input a print job, and image forming apparatuses 102, 103a, 103b, and 104 each of which can process the input print job. These devices are connected to be communicable with one another via a local area network (LAN) 105. The respective numbers of PCs and image forming apparatuses to be connected to one another are not limited thereto. In this printing system, one of the image forming apparatuses 102, 103a, 103b, and 104 is set to a biographic server apparatus. The biographic server apparatus also has a function of comprehensively managing information about the print job (bibliographic information) input to each of the image forming apparatuses 102, 103a, 103b, and 104 from the PC 101. To set the bibliographic server apparatus, identification information (e.g., IP address) about the image forming apparatus serving as the bibliographic server apparatus may be registered in each of the other image forming apparatuses. In the present exemplary embodiment, the image forming apparatus 102 is set as the biographic server apparatus. While an input source of the print job is the PC 101 in the present exemplary embodiment, a device other than the PC 101 (e.g., a portable terminal or another image forming apparatus) may be an input source. While the image forming apparatus 102 is the bibliographic server apparatus in the present exemplary embodiment, the bibliographic server apparatus is not limited thereto if it can store and manage bibliographic information. For example, the bibliographic server apparatus may be a server apparatus having no printing function.

When the print job is input to each of the image forming apparatuses 103a and 103b from the PC 101, the image forming apparatuses 103a and 103b store and manage print data and the bibliographic information for each user of the print job. Details of the processing will be described below with reference to FIG. 14. The image forming apparatus storing print data is hereinafter referred to as a storage apparatus. The image forming apparatuses 103a and 103b transmit the bibliographic information to the image forming apparatus 102 serving as the bibliographic server apparatus. The bibliographic information includes a user identifier, and can identify and specify a user in a transmission source of a print job. The image forming apparatus 102 stores and manages the received bibliographic information for each user based on the user identifier. Details of the processing will be described below with reference to FIG. 16.

Each of the image forming apparatuses has an authentication function, and the user can log into the image forming apparatus. A case where the user logs into the image forming apparatus 104 will be described below. The image forming apparatus, which performs printing, is referred to as an output apparatus.

When the user logs into the image forming apparatus 104, the image forming apparatus 104 transmits a user identifier of a user (log-in user) who has logged into the image forming apparatus 102 serving as the bibliographic server. The image forming apparatus 102 returns, when it receives the user identifier, bibliographic information about print data associated with the user identifier to the image forming apparatus 104. The image forming apparatus 104 displays, when it receives the bibliographic information, a list of print jobs based on the bibliographic information. Details of the processing will be described below with reference to FIGS. 10 to 12 and FIGS. 17 to 19. When a print job (identification information about print data) is selected from the print job list, the image forming apparatus 104 specifies a storage destination of print data of the print job selected based on the bibliographic information. The storage destination of the print data is the image forming apparatus 103a or 103b serving as a storage apparatus, for example.

The image forming apparatus 104 acquires print data from the specified storage apparatus. The acquired print data is printed as a print job according to a setting determined in the bibliographic information. Details of the processing will be described below with reference to FIGS. 14 to 16. Each of the image forming apparatuses 103a and 103b each serving as the storage apparatus is one example of a first image forming apparatus having a storage function. The image forming apparatus 102 serving as a bibliographic server apparatus is an example of a second image forming apparatus having a server function. The image forming apparatus 104 serving as an output apparatus is an example of a third image forming apparatus having an output function. The PC 101 is an example of an external apparatus that inputs a print job.

Figure 2:
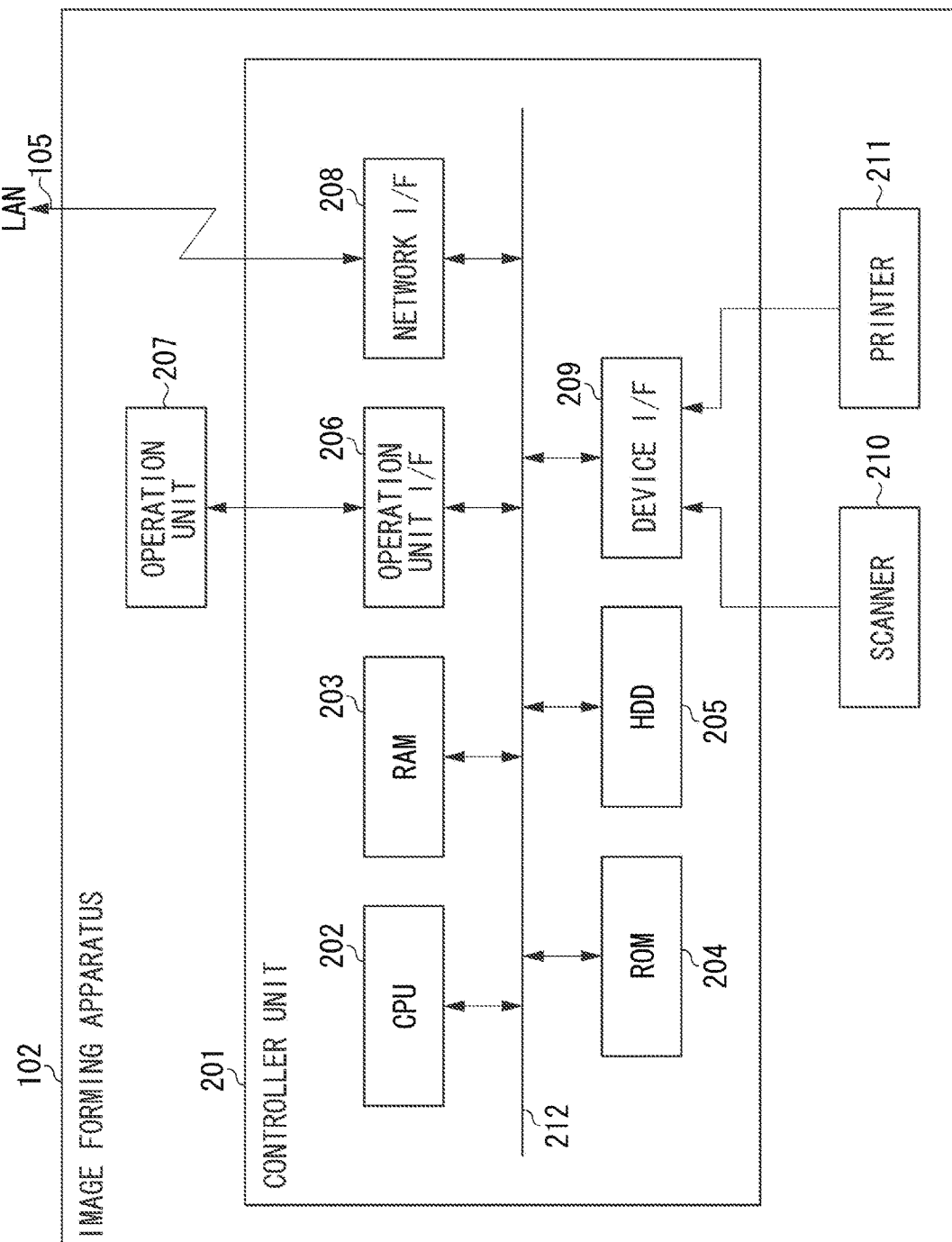
FIG. 2 is a block diagram illustrating an example of a hardware configuration of an image forming apparatus.

FIG. 2 is a block diagram illustrating an example of a hardware configuration of each of the image forming apparatuses 102, 103a, 103b, and 104. In a controller unit 201 in each of the image forming apparatuses 102, 103a, 103b, and 104, a central processing unit (CPU) 202 is a calculation device for controlling the entire system. A random access memory (RAM) 203 is a system work memory for the CPU 202 to operate, and is an image memory for temporarily storing image data. In the RAM 203, programs such as an operating system, system software, and application software and data are also arranged. A read-only memory (ROM) 204 stores a boot program for the system. A hard disk drive (HDD) 205 stores programs such as an operating system, system software, and application software, image data, and setting data. An operation unit interface (I/F) 206 is an interface unit with an operation unit 207, and outputs information to be displayed on the operation unit 207 to the operation unit 207. The operation unit I/F 206 accepts information input by the user from the operation unit 207. A network I/F 208 is connected to the network (LAN) 105, and inputs and outputs information to and from PCs connected to the same LAN and other image forming apparatuses. A device I/F 209 connects a scanner 210 (image input device) and a printer 211 (image output device) with a controller unit 201 to each other, and inputs and outputs image data. The above-described devices are arranged on a system bus 212.

The CPU 202 implements various types of processing by performing processes based on the program or programs stored in the ROM 204 or the HDD 205, and functions as various types of functional units. Respective flowcharts of the various types of processing and a software configuration functioning as each of the various types of functional units will be described below.

Figure 3:
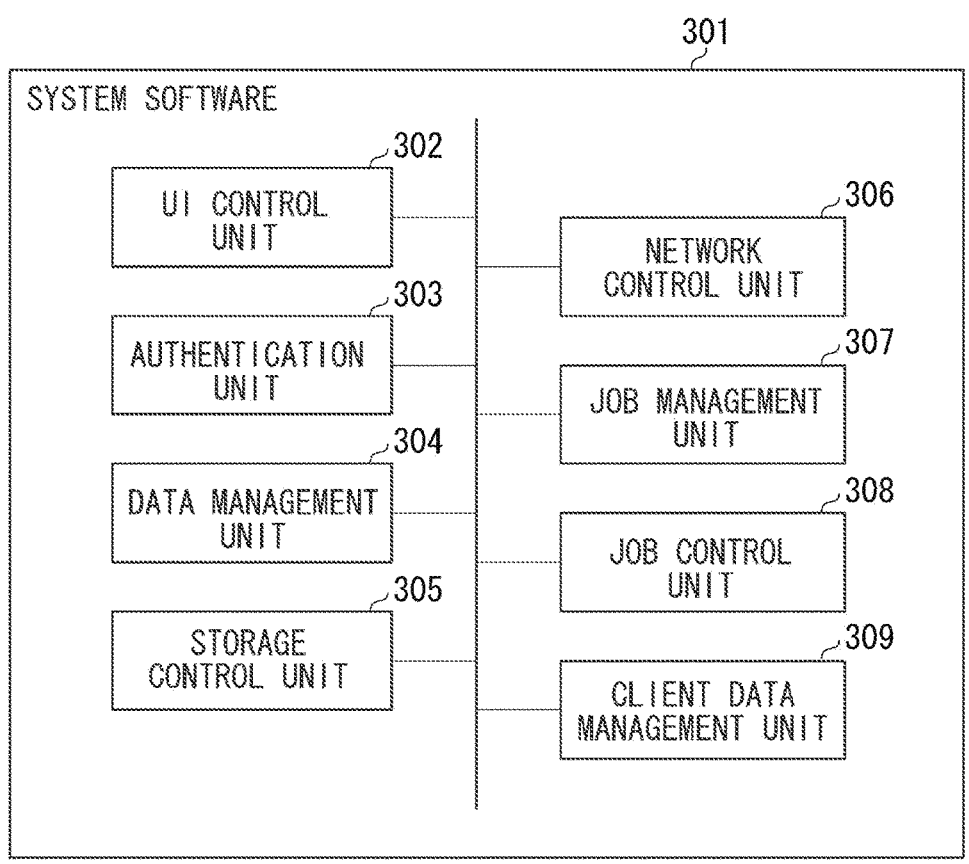
FIG. 3 is a block diagram illustrating an example of a software configuration of the image forming apparatus.

FIG. 3 is a block diagram illustrating an example of a software configuration of each of the image forming apparatuses 102, 103a, 103b, and 104.

A user interface (UI) control unit 302 receives information input by the user using the operation unit 207 via the operation unit I/F 206, and transmits the information to an authentication unit 303, a data management unit 304, and a job management unit 307. The UI control unit 302 receives respective responses from the authentication unit 303, the data management unit 304, and the job management unit 307. The information is output to the operation unit 207 via the operation unit I/F 206.

The authentication unit 303 performs authentication processing based on authentication information received from the UI control unit 302, and returns a result of the authentication.

The data management unit 304 receives data write request and read request from the UI control unit 302, the network control unit 306, and the job management unit 307, and transmits the data write request and read request to the storage control unit 305. The data management unit 304 receives a response from the storage control unit 305, and transmits information relating to the response to the UI control unit 302, the network control unit 306, and the job management unit 307.

The storage control unit 305 receives the data write request and read request from the data management unit 304, writes and reads data to and from the HDD 205, and returns a writing and reading result to the data management unit 304.

The network control unit 306 receives a request from the PC 101 or the any image forming apparatus connected to the LAN 105 via the network I/F 208. The network control unit 306 requests processing from the data management unit 304 and a client data management unit 309 in response to the received request. Alternatively, the network control unit 306 receives responses from the data management unit 304 and the client data management unit 309. The network control unit 306 transmits the received responses to the PC 101 or any image forming apparatus connected to the LAN 105 via the network I/F 208.

The job management unit 307 receives a job execution request from the UI control unit 302, and manages a job. The job management unit 307 requests a job control unit 308 to execute the job. Alternatively, the job management unit 307 transmits the data write request and a read request to the data management unit 304. Alternatively, the job management unit 307 receives responses from the data management unit 304 and the job control unit 308, and transmits a state of the job to the UI control unit 302 and the network control unit 306.

The job control unit 308 receives the job execution request from the job management unit 307, and controls operations of the scanner 210 and the printer 211 via the device I/F 209. Alternatively, the job control unit 308 receives operation statuses of the scanner 210 and the printer 211 via the device I/F 209, and transmits the received operation statuses to the job management unit 307.

The client data management unit 309 receives the data write request and read request from the network control unit 306, and transmits the data write request and read request to the storage control unit 305. Alternatively, the client data management unit 309 receives a response from the storage control unit 305, and transmits information relating to the response to the network control unit 306 and the job management unit 307.

Figure 4:
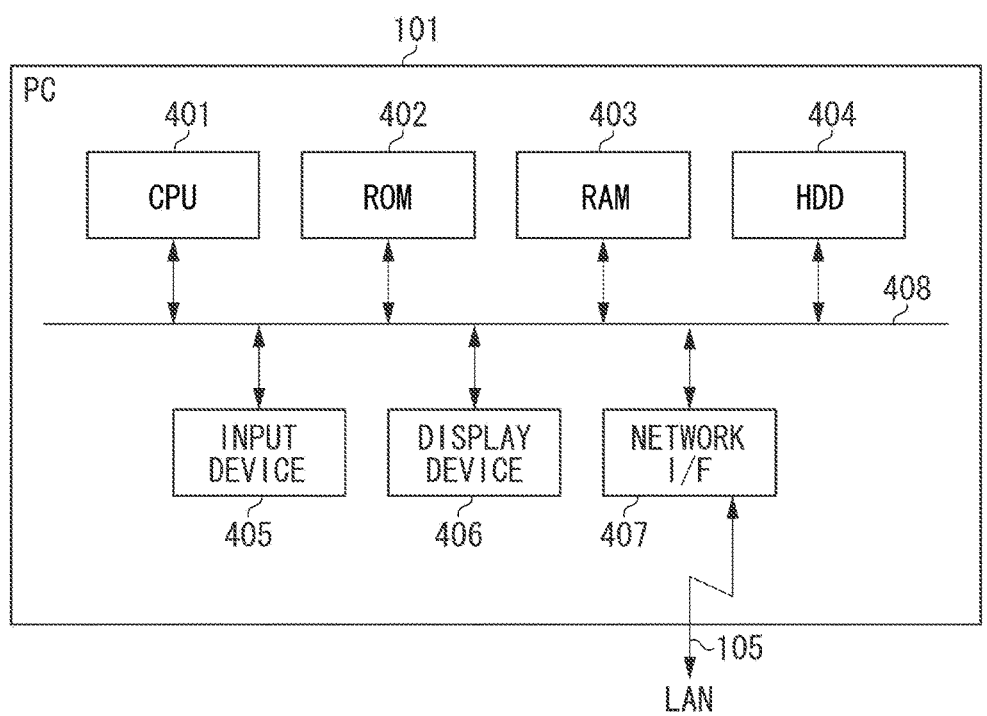
FIG. 4 is a block diagram illustrating an example of a hardware configuration of a personal computer (PC).

FIG. 4 is a block diagram illustrating an example of a hardware configuration of the PC 101. In the PC 101, a CPU 401 is a calculation device for controlling the entire system. A ROM 402 stores a program and data relating to each of processes. A RAM 403 is a system work memory for the CPU 401 to operate, and is a storage memory temporary storing data relating to each of the processes. A hard disk drive (HDD) 404 stores a program, data, temporary data, and application data relating to each of the processes. An input device 405 is a keyboard or a pointing device for accepting input of an instruction to the PC 101 itself. A display device 406 displays an operation status of the PC 101 itself and information about a result of the processes performed based on each of the programs by the CPU 401. A network I/F 407 is connected to the network (LAN) 105, and inputs and outputs information to and from another PC or image forming apparatus connected to the same LAN. The above-described elements are arranged on a system bus 408.

The CPU 401 performs the processes based on an operating system (OS) and programs corresponding to a printer driver and an application, which are stored in the HDD 404, to implement functions or processing by the OS and the printer driver. The CPU 401 performs the processes based on the program or programs stored in the ROM 402 or the HDD 404, to implement a software configuration illustrated in FIG. 5 and processing in a flowchart illustrated in FIG. 6, described below.

Figure 5:
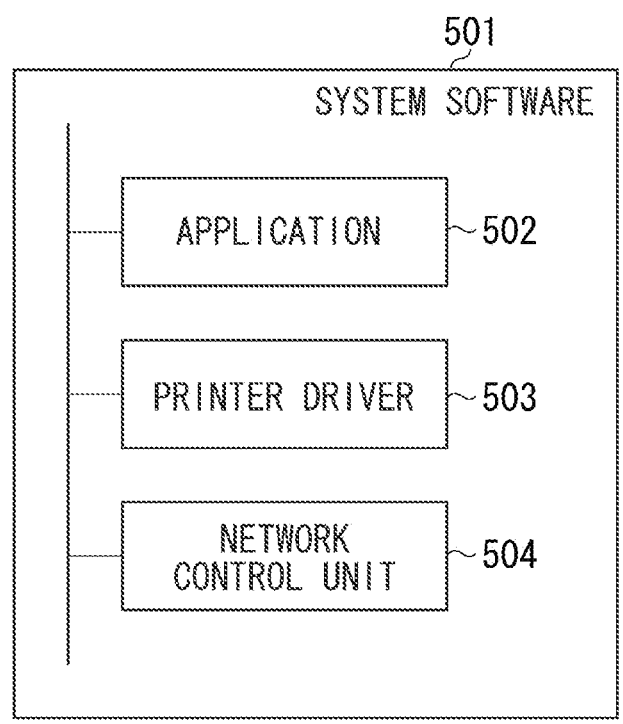
FIG. 5 is a block diagram illustrating an example of a software configuration of the PC.

FIG. 5 is a block diagram illustrating an example of a software configuration of the PC 101.

System software 501 includes an application 502, a printer driver 503, and a network control unit 504. The application 502 is a tool to create and edit an image or a document using the input device 405 such as a pointing device or a keyboard while seeing the display device 406 for the PC 101, for example. Alternatively, the application 502 is a tool to refer to information within the image forming apparatus. The user generates data of an image and/or a document using the application 502, generates printing instruction data using the printer driver 503, and transmits the generated printing instruction data to printable apparatuses such as the image forming apparatuses 102, 103a, 103b, and 104 via the network control unit 504. Alternatively, the application 502 acquires and refers to information from the image forming apparatuses 102, 103a, 103b, and 104 via the network control unit 504.

Figure 6:
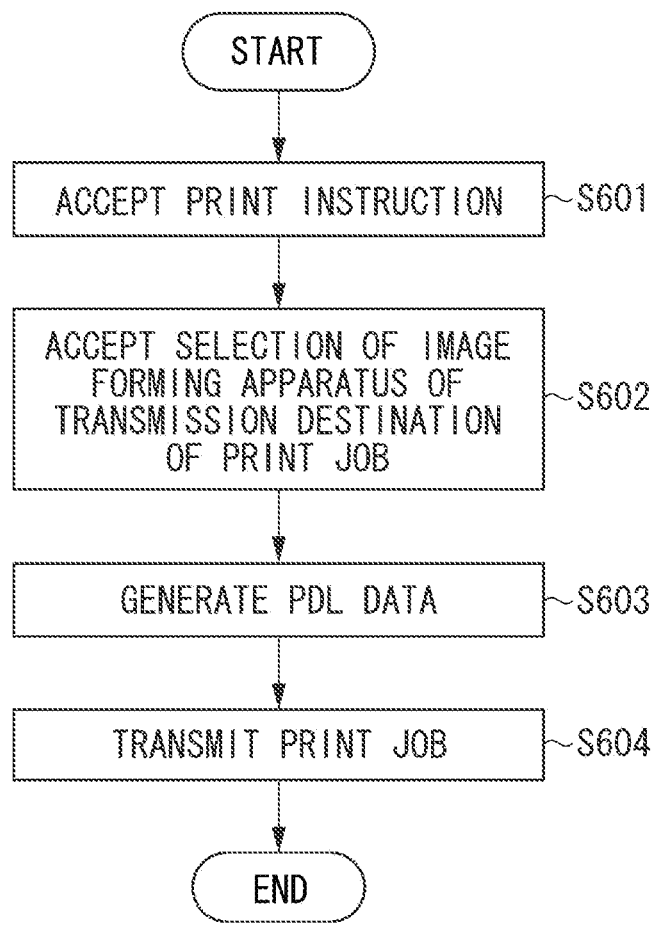
FIG. 6 is a flowchart illustrating print job input processing.

FIG. 6 is a flowchart illustrating print job input processing performed by the CPU 401 of the PC 101. In the present exemplary embodiment, a print job is input from the PC 101 to the image forming apparatus 103a serving as a storage apparatus.

The user generates data of an image and/or a document with use of the application 502 and the input device 405 such as a pointing device or a keyboard while seeing the display device 406, and issues a printing instruction to the application 502. In step S601, the application 502 accepts the printing instruction. The application 502 displays a screen for allowing the user to select the image forming apparatus, which transmits the print job, on the display device 406. In step S602, the application 502 accepts the selection by the user of the image forming apparatus for transmitting the print job. The application 502 requests the printer driver 503 corresponding to the selected image forming apparatus to generate data.

In step S603, the printer driver 503 generates page description language (PDL) data according to data of an image and/or a document, a document attribute such as a document name, and print setting information set in the printer driver 503 during a printing instruction. In step S604, the printer driver 503 transmits the generated PDL data as a print job to the image forming apparatus 103a.

Figure 7:
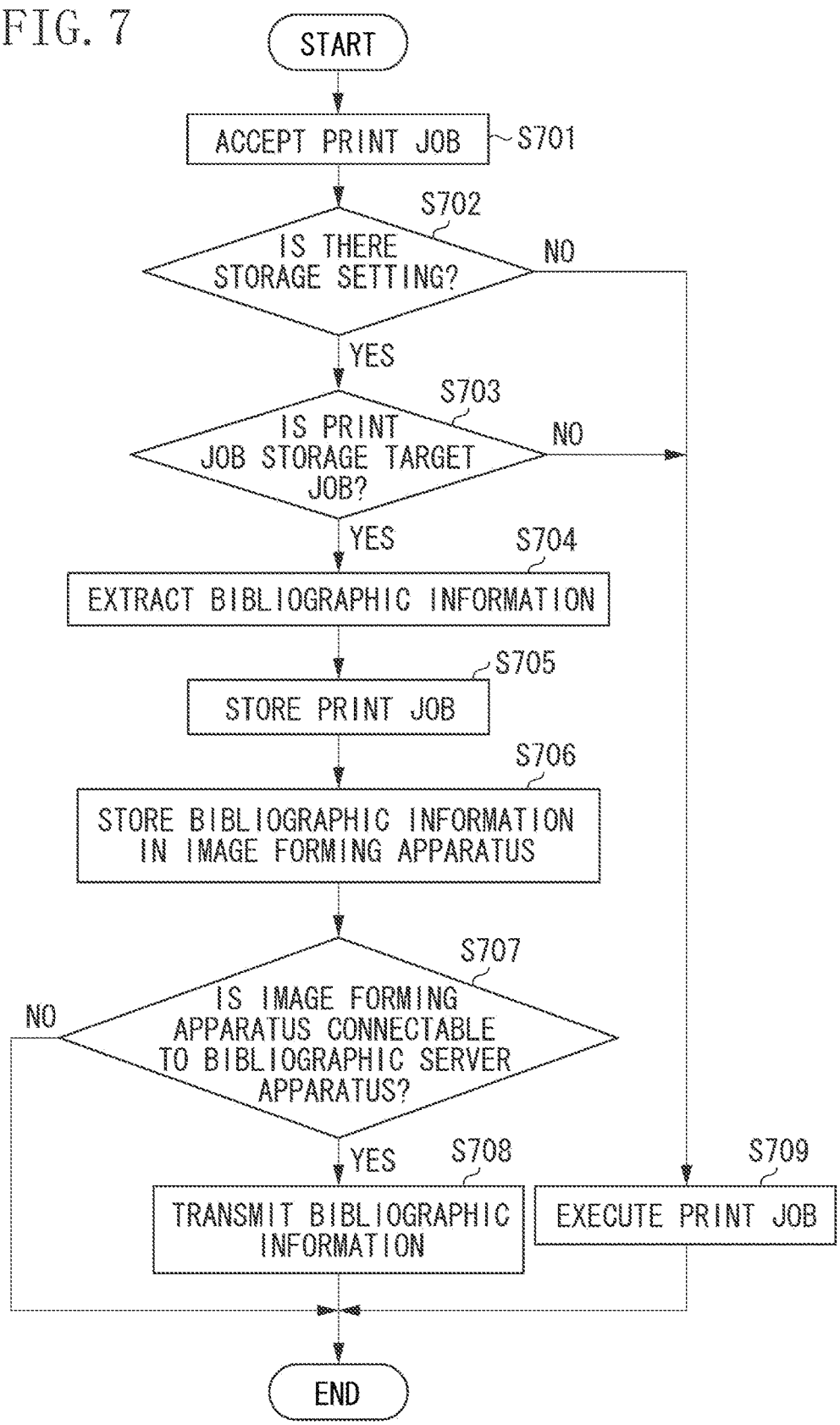
FIG. 7 is a flowchart illustrating print job storage processing.

FIG. 7 is a flowchart illustrating print job storage processing performed by the CPU 202 in the image forming apparatus 103a based on the system software 301.

In step S701, the network control unit 306 accepts the print job from the PC 101. Then, the network control unit 306 transmits the received print job to the job management unit 307. In step S702, the job management unit 307 determines, when it receives the print job, whether a storage setting of the print job exists in the image forming apparatus 102. The storage setting of the print job is set for each image forming apparatus, and is stored in the HDD 205 or the RAM 203 by the storage control unit 305. If the storage setting of the print job does not exist (NO in step S702), then in step S709, the job management unit 307 requests the job control unit 308 to execute the print job, to perform printing. If the storage setting of the print job exists (YES in step S702), then in step S703, the job management unit 307 analyzes the print job, and determines whether the print job is a storage target job. The job management unit 307 sets the print job as a storage target job when information assigned to the print job, such as a print job name, a print job user name, and identification information about a PC that has executed the print job, matches a previously determined condition. Alternatively, the job management unit 307 may set the print job as a storage target job when the information assigned to the print job does not match the condition. If the print job is not the storage target job (NO in step S703), then in step S709, the job management unit 307 requests the job control unit 308 to execute the print job, to perform printing. If the print job is the storage target job (YES in step S703), the job management unit 307 transmits the print job to the data management unit 304. In step S704, the data management unit 304 analyzes the print job received from the job management unit 307, and extracts bibliographic information. Then, the data management unit 304 transmits the print job and the extracted bibliographic information to the storage control unit 305. In step S705, the storage control unit 305 stores the received print job in the HDD 205 after associating the print job with the user. In step S706, the storage control unit 305 stores the extracted bibliographic information in the HDD 205 after associating the bibliographic information with the user. FIG. 8 illustrates an example of a bibliographic information list stored in the HDD 205. A bibliographic information list 801 is a bibliographic information list for a User A. The bibliographic information list 801 includes a date 802 at which the print job has been input, an IP address 803 of the image forming apparatus to which the print job has been input, a storage location 804 of the input print job, a print job name 805, and a print setting 806. In step S707, the data management unit 304 then determines whether the image forming apparatus 103a is connectable to the image forming apparatus 102 having a bibliographic server function via the network control unit 306. If the image forming apparatus 103a is not connectable to the image forming apparatus 102 (NO in step S707), processing in the flowchart illustrated in FIG. 7 ends. If the image forming apparatus 103a is connectable to the image forming apparatus 102 (YES in step S707), then in step S708, the data management unit 304 transmits the bibliographic information to the image forming apparatus 102 via the network control unit 306.

Through the foregoing processes, the print job storage processing is performed.

Figure 9:
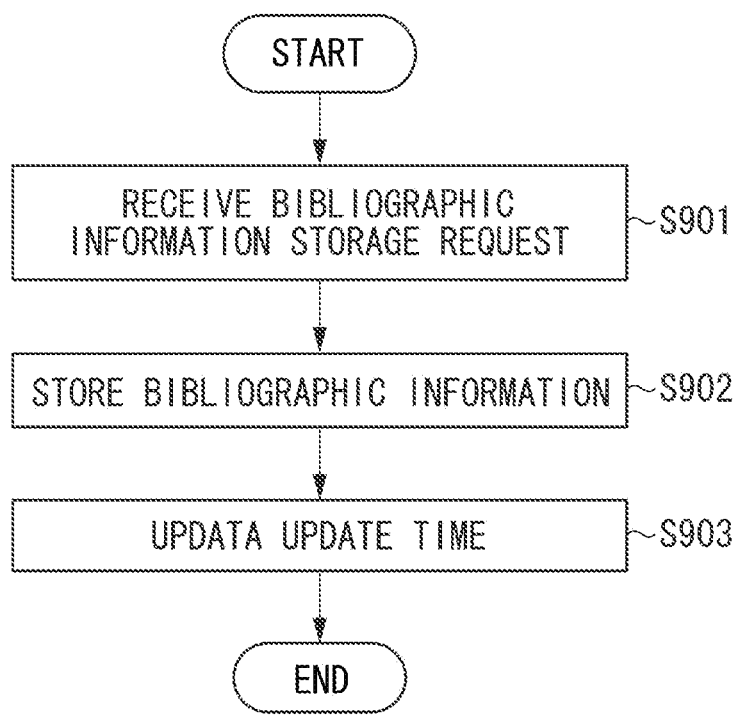
FIG. 9 is a flowchart illustrating bibliographic information storage processing.

FIG. 9 is a flowchart illustrating bibliographic information storage processing performed based on the system software 301 by the CPU 202 in the image forming apparatus 102 serving as a bibliographic server apparatus.

In step S901, the network control unit 306 receives a bibliographic information storage request. The network control unit 306 transmits received bibliographic information to the client data management unit 309. In step S902, the client data management unit 309 stores the received bibliographic information into the HDD 205 via the storage control unit 305. In step S903, the client data management unit 309 updates the time when the bibliographic information is updated via the storage control unit 305. The client data management unit 309 manages the bibliographic information for each user after associating the bibliographic information with a user identifier included in the bibliographic information storage request. Through the foregoing processes, the bibliographic information storage processing is performed.

Figure 10:
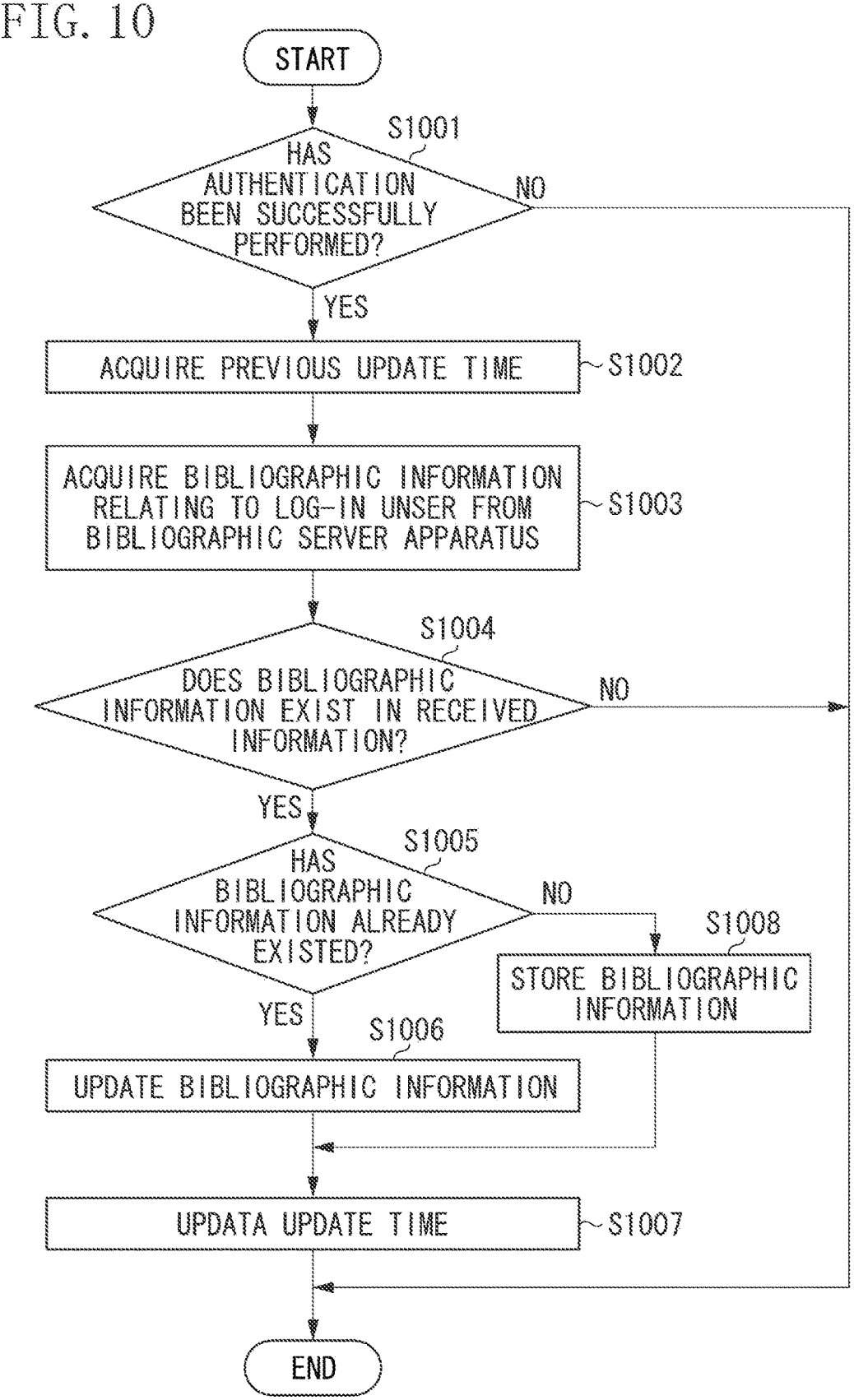
FIG. 10 is a flowchart illustrating bibliographic information acquisition processing.

FIG. 10 is a flowchart illustrating bibliographic information acquisition processing performed by the CPU 202 in the image forming apparatus 104 based on the system software 301.

In step S1001, the authentication unit 303 performs authentication processing using login information input via the operation unit 207 by the user, and determines whether the authentication processing has been successfully performed. If the authentication processing has not been successfully performed (NO in step S1001), the processing in the flowchart illustrated in FIG. 10 ends. If the authentication processing has been successfully performed (YES in step S1001), then in step S1002, the data management unit 304 acquires the time when previous bibliographic information has been updated from the image forming apparatus 102 serving as a bibliographic server apparatus from the HDD 205 via the storage control unit 305. In step S1003, the data management unit 304 transmits a request to acquire bibliographic information relating to a log-in user, together with the acquired update time, to the image forming apparatus 102 via the network control unit 306. In step S1004, the data management unit 304 confirms, when it receives a result of the bibliographic information acquisition request from the image forming apparatus 102, whether bibliographic information exists in the information about the received result. If the bibliographic information does not exist (NO in step S1004), the processing in the flowchart illustrated in FIG. 10 ends. If the bibliographic information exists (YES in step S1004), then in step S1005, the data management unit 304 determines whether bibliographic information has already existed. If the bibliographic information has already existed (YES in step S1005), then in step S1006, the data management unit 304 updates the bibliographic information already existing with the received bibliographic information. If the bibliographic information has not existed (NO in step S1005), then in step S1008, the data management unit 304 stores the received bibliographic information. In step S1007, the data management unit 304 then updates the update time stored in the HDD 205 to the time when the bibliographic information has been received, and the processing in the flowchart illustrated in FIG. 10 ends.

Through the foregoing processes, the bibliographic information acquisition processing is performed.

Figure 11:
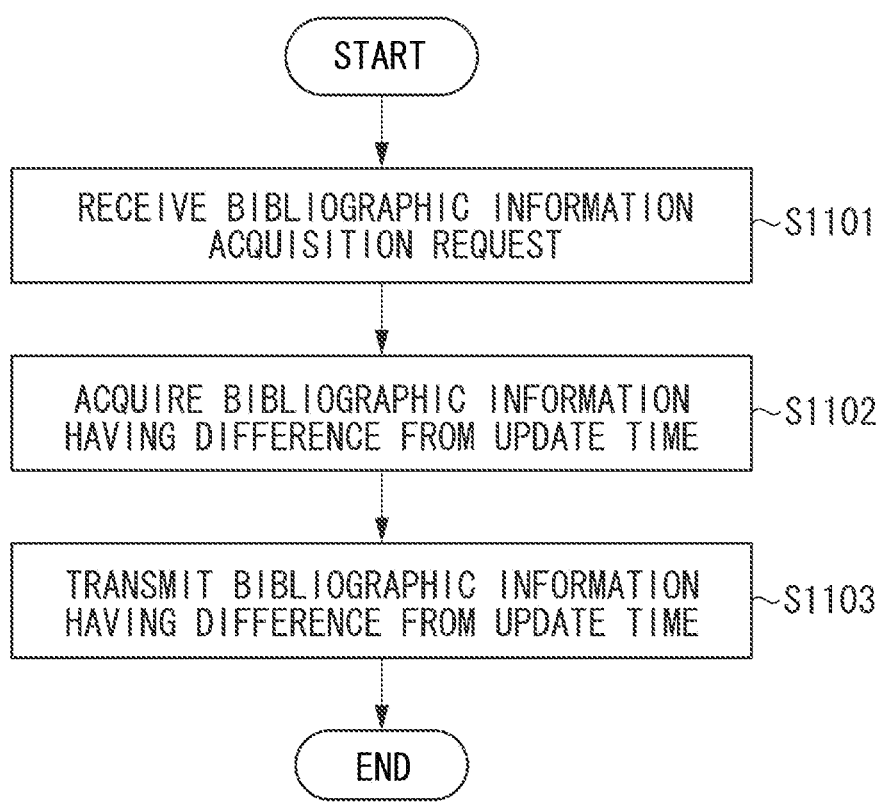
FIG. 11 is a flowchart illustrating bibliographic information transmission processing.

FIG. 11 is a flowchart illustrating bibliographic information transmission processing performed based on the system software 301 by the CPU 202 in the image forming apparatus 102 serving as a bibliographic server apparatus.

In step S1101, the network control unit 306 receives a bibliographic information acquisition request. The network control unit 306 transmits the received acquisition request and an update time to the client data management unit 309. In step S1102, the client data management unit 309 acquires bibliographic information about a user stored in the HDD 205, and extracts bibliographic information having a difference from the received update time, via the storage control unit 305. In step S1103, the client data management unit 309 transmits the extracted bibliographic information having a difference from the update time to the update time to the image forming apparatus 104 via the network control unit 306.

Through the foregoing processes, the bibliographic information transmission processing is performed.

Figure 12:
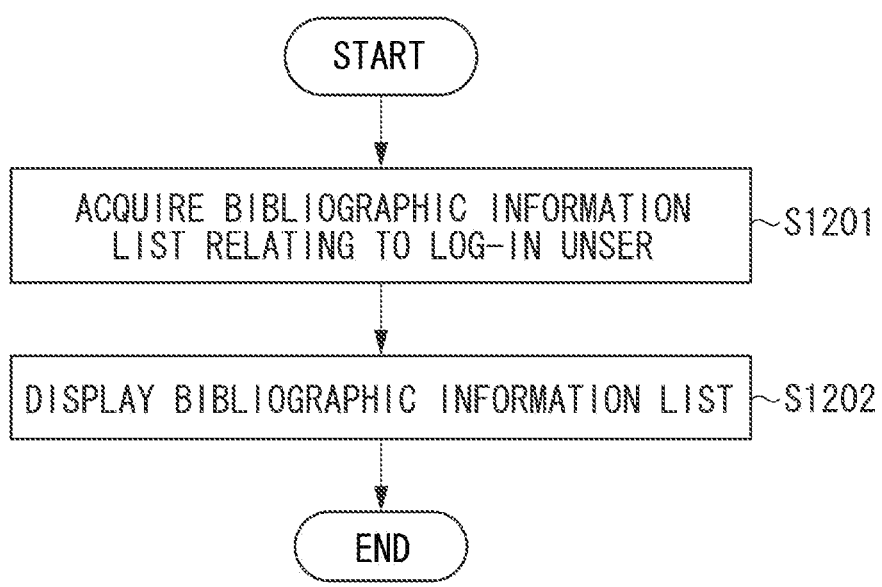
FIG. 12 is a flowchart illustrating print job list display processing.

FIG. 12 is a flowchart illustrating print job list display processing performed based on the system software 301 by the CPU 202 in the image forming apparatus 104.

In step S1201, the data management unit 304 acquires a bibliographic information list relating to a log-in user from the HDD 205 via the storage control unit 305. The data management unit 304 transmits the bibliographic information list to the UI control unit 302. In step S1202, the UI control unit 302 displays the received bibliographic information list on the operation unit 207. FIG. 13 illustrates an example of a screen on which a print job list 1301 is displayed. While other examples of a method for displaying a result include an icon, the result display method is not limited thereto if a printable state can be represented.

Through the foregoing processes, the print job list display processing is performed.

Figure 14:
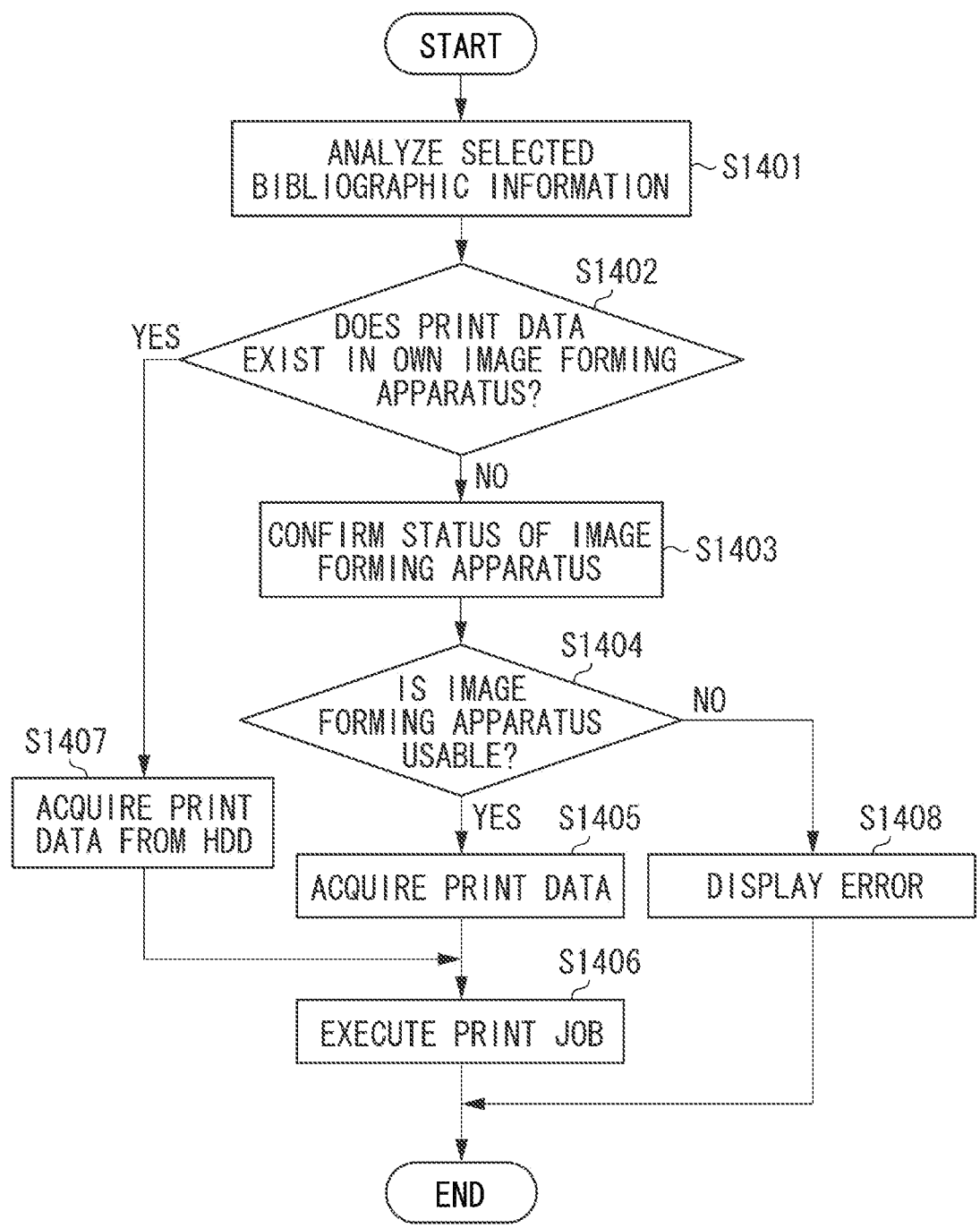
FIG. 14 is a flowchart illustrating print processing.

FIG. 14 is a flowchart illustrating print processing performed based on the system software 301 by the CPU 202 in the image forming apparatus 104.

Figure 15:
FIG. 15 illustrates an example of a screen on which an error message is displayed.

When the user issues a printing instruction from the operation unit 207, the job management unit 307 receives information about the printing instruction via the UI control unit 302. In step S1401, the job management unit 307 analyzes bibliographic information about a printing target, and transmits a request to acquire a print job to the data management unit 304. The job management unit 307 selects the bibliographic information in response to a selection operation by the user from the bibliographic information list as illustrated in FIG. 13. Processing performed by the job management unit 307 for specifying an image forming apparatus corresponding to the selected bibliographic information is an example of processing for specifying an image forming apparatus storing print data of a print job for a log-in user. In step S1402, the data management unit 304 determines whether print data exists in the image forming apparatus 104 based on information about an IP address included in the bibliographic information analyzed by the job management unit 307. If the print data exists in the image forming apparatus 104 (YES in step S1402), then in step S1407, the data management unit 304 acquires the designated print data from the HDD 205 via the storage control unit 305. If the print data does not exist in the image forming apparatus 140 (NO in step S1402), then in step S1403, the data management unit 304 issues a request to acquire a status of the image forming apparatus storing print data corresponding to the bibliographic information via the network control unit 306. In step S1404, the data management unit 304 determines whether the image forming apparatus storing the print data corresponding to the bibliographic information is usable according to a response obtained in response to the status acquisition request from the image forming apparatus storing the print data corresponding to the bibliographic information. The data management unit 304 determines that the image forming apparatus is usable when a content of the response indicates that the image forming apparatus is usable, and determines that the image forming apparatus is unusable when the response has not returned within a predetermined period of time or when the content of the response indicates that the image forming apparatus is unusable. If the image forming apparatus is not usable (NO in step S1404), then in step S1408, the data management unit 304 displays an error message on the operation unit 207 via the UI control unit 302, and the processing in the flowchart illustrated in FIG. 14 ends. FIG. 15 illustrates an example of a screen on which an error message is displayed. A message 1501 represents an error message displayed on a print job list. A method for displaying the error message is not limited thereto if it can express a failure to perform printing. If the image forming apparatus is usable (YES in step S1401), then in step S1405, the data management unit 304 acquires, from the image forming apparatus storing the print data corresponding to the bibliographic information, the print data. The data management unit 304 transmits the print job to the job control unit 308 via the job management unit 307. In step S1406, the job control unit 308 outputs the received print job using the printer 211. Processes in steps S1403 and S1404 are an example of confirmation processing for checking the status of the image forming apparatus.

Through the foregoing processes, the printing processing is performed.

Figure 16:
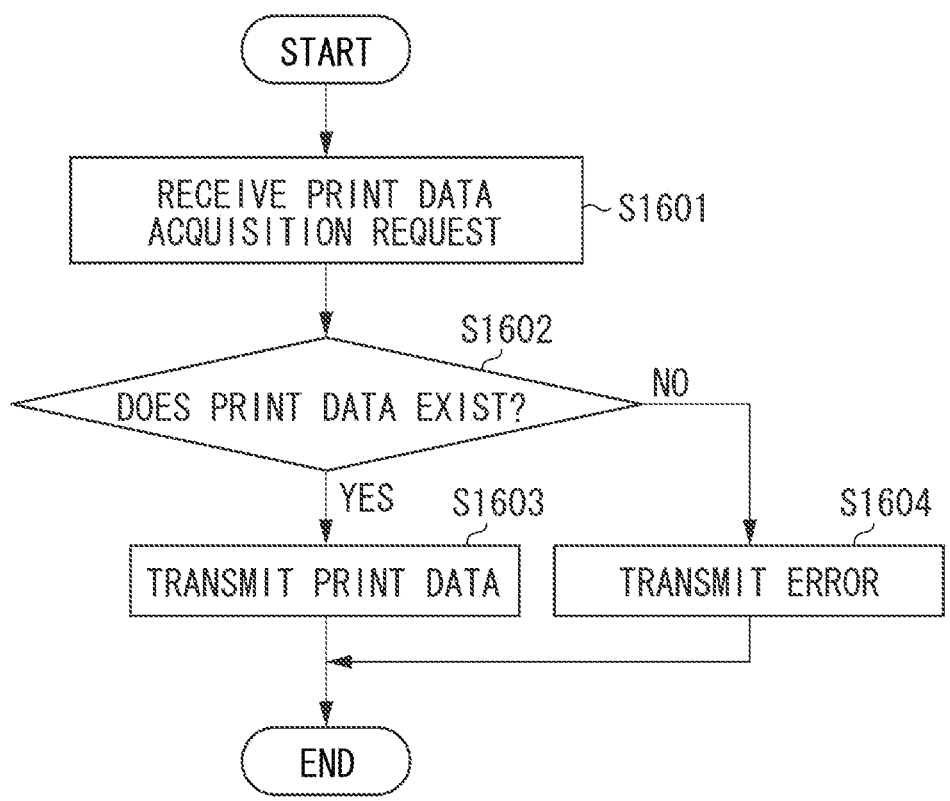
FIG. 16 is a flowchart illustrating print data transmission processing.

FIG. 16 is a flowchart illustrating print data transmission processing performed based on the system software 301 by the CPU 202 in the image forming apparatus 103a.

In step S1601, the network control unit 306 receives a print data acquisition request. Then, the network control unit 306 transmits the received acquisition request to the data management unit 304. In step S1602, the data management unit 304 determines whether print data, which has been requested from the HDD 205 via the storage control unit 305, exists. If the print data exists (YES in step S1602), then in step S1603, the data management unit 304 transmits the print data to the image forming apparatus 104 via the network control unit 306. If the print data does not exist (NO in step S1602), then in step S1604, the data management unit 304 transmits an error indicating that no print data exists to the image forming apparatus 104 via the network control unit 306.

Through the foregoing processes, the print data transmission processing is performed.

In FIG. 8, an IP address "192.168.2.11" is an address of the image forming apparatus 103a, for example. Therefore, if the image forming apparatus 103a is offline, when a print job including print data in the image forming apparatus 103a is selected from the job list illustrated in FIG. 13, an error screen is displayed, as illustrated in FIG. 15.

In a second exemplary embodiment, a method for notifying, when an image forming apparatus other than an image forming apparatus storing print jobs displays a list of print jobs, a user that the print jobs cannot be acquired from the image forming apparatus storing the print jobs will be described. The configurations and the processing illustrated in FIGS. 1 to 9, 11, 12, and 16 in the first exemplary embodiment are the same as those in the present exemplary embodiment, and hence description thereof is not repeated.

Figure 17:
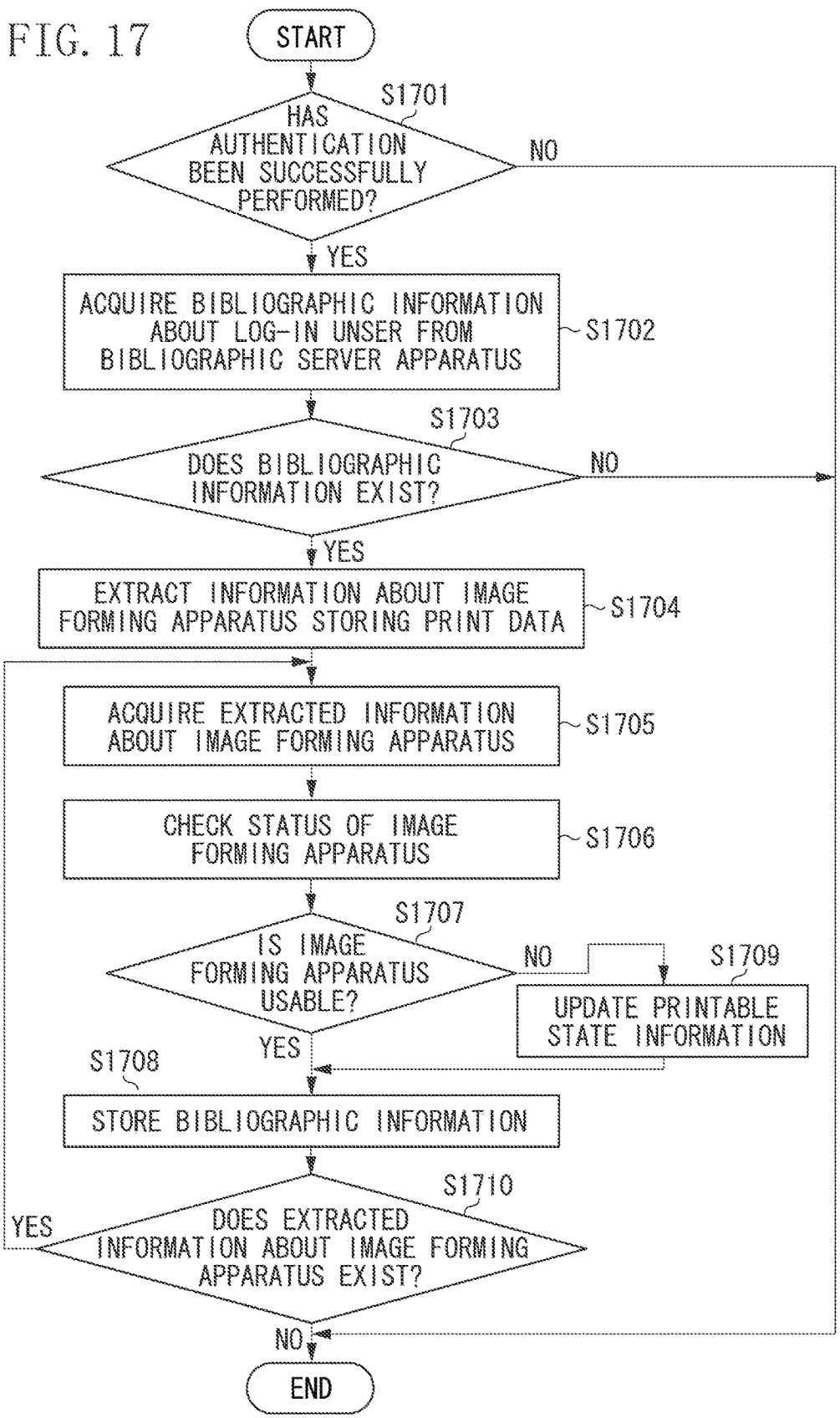
FIG. 17 is a flowchart illustrating bibliographic information acquisition processing.

FIG. 17 is a flowchart illustrating bibliographic information acquisition processing performed based on a system software 301 by a CPU 202 in an image forming apparatus 104.

In step S1701, an authentication unit 303 performs authentication processing using login information input via an operation unit 207 by the user, and determines whether the authentication processing has been successfully performed. If the authentication processing has been unsuccessfully performed (NO in step S1701), the processing in the flowchart illustrated in FIG. 17 ends. If the authentication processing has been successfully performed (YES in step S1701), then in step S1702, a data management unit 304 requests an image forming apparatus 102 to acquire bibliographic information relating to a log-in user via a network control unit 306. In the image forming apparatus 102, the network control unit 306 transmits the received acquisition request to a client data management unit 309. The client data management unit 309 acquires bibliographic information relating to a user stored in a HDD 205 via a storage control unit 305, and transmits the acquired bibliographic information to the image forming apparatus 104 via the network control unit 306. In step S1703, the data management unit 304 confirms whether received bibliographic information exists. If the bibliographic information does not exist (NO in step S1703), the processing in the flowchart illustrated in FIG. 17 ends. If the bibliographic information exists (YES in step S1703), then in step S1704, the data management unit 304 acquires information about an image forming apparatus storing print data corresponding to the bibliographic information, i.e., the data management unit 304 acquires an IP address of the image forming apparatus storing the print data from the acquired bibliographic information. A process in step S1704 is an example of processing for specifying an image forming apparatus storing print data of a print job for a log-in user. Further, in step S1705, the data management unit 304 sequentially acquires extracted information about the image forming apparatus. In step S1706, the data management unit 304 issues a status acquisition request to the image forming apparatus via the network control unit 306. In step S1707, the data management unit 304 determines whether the image forming apparatus is usable according to a response obtained in response to the status acquisition request of the image forming apparatus, which has been received via the network control unit 306. If the image forming apparatus is not usable (NO in step S1707), then in step S1709, the data management unit 304 updates printable state information to a value indicating that printing is impossible. In step S1708, the data management unit 304 stores the bibliographic information in the HDD 205 via the storage control unit 305. If the image forming apparatus is usable (YES in step S1707), then in step S1708, the data management unit 304 stores the bibliographic information in the HDD 205 via the storage control unit 305 without changing the printable state information from a value indicating that printing is possible. FIG. 18 illustrates an example of a bibliographic information list stored in the HDD 205. A bibliographic information list 1801 is a bibliographic information list for a user A. The bibliographic information list 1801 includes a date 1802 on which a print job has been input, an IP address 1803 of an image forming apparatus to which the print job has been input, a storage location 1804 of the input print job, a print job name 804, a print setting 1806, and a printable state 1807. In step S1710, the data management unit 304 then determines whether the extracted information about the image forming apparatus still exists. If the information exists (YES in step S1710), the processing returns to step S1705. On the other hand, if the information does not exist (NO in step S1710), the processing in the flowchart illustrated in FIG. 17 ends. Processes in steps S1706 and S1707 are an example of checking processing for checking the status of the image forming apparatus.

Through the foregoing processes, the bibliographic information acquisition processing is performed.

In FIG. 18, an IP address "192.168.2.11" is an address of an image forming apparatus 103a, for example. An IP address "192.168.2.12" is an address of an image forming apparatus 103b, for example. An IP address "192.168.2.13" is an address of an image forming apparatus 104, for example.

Therefore, if the image forming apparatus 103a is offline, and the image forming apparatus 103b is online, a printable state of a print job "AAA.txt" is "NG", and a printable state of a print job "BBB.pdf" is "OK". A printable state of a print job "CCC.Doc" is always "OK" because print data is within the image forming apparatus 104.

Figure 19:
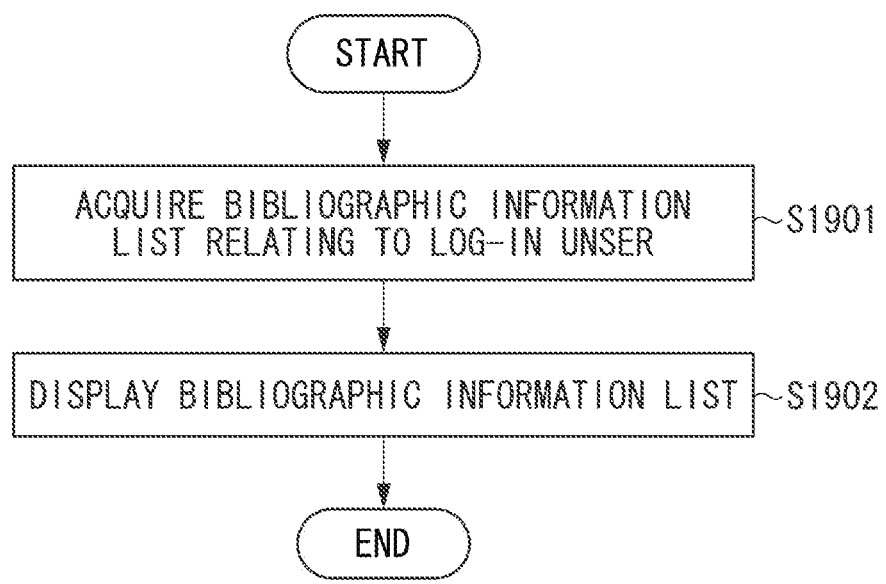
FIG. 19 is a flowchart illustrating print job list display processing.

FIG. 19 is a flowchart illustrating print job list display processing performed based on the system software 301 by the CPU 202 in the image forming apparatus 104.

In step S1901, the data management unit 304 acquires a bibliographic information list relating to a log-in user from the HDD 205 via the storage control unit 305. The data management unit 304 transmits the bibliographic information list to the UI control unit 302. In step S1902, the UI control unit 302 displays the received bibliographic information list on an operation unit 207. FIG. 20 illustrates an example of a screen on which a printable display 2002 indicating whether a print job is printable, together with a print job list 2001, is displayed.

More specifically, if the image forming apparatus 103a is offline, and the image forming apparatus 103b is online, the printable display 2002 of the print job "AAA.txt" is "NG", and the printable display 2002 of the print job "BBB.pdf" is "OK". The printable display 2002 of the job "CCC.Doc" is always "OK" because print data is within the image forming apparatus 104.

A method for notifying the user whether printing is possible is not limited to a method for displaying characters, like "OK" or "NG", as illustrated in FIG. 20. For example, "OK" may be replaced with an icon like "○", and "NG" may be replaced with an icon like "x".

In addition, a modified example as illustrated in FIG. 21 can be considered. FIG. 21 illustrates a modified example of a printable display.

In FIG. 21A, identification information about an unprintable job "AAA.txt" is subjected to mask processing. When thus displayed, the job is easily visually determined to be unprintable.

In FIG. 21B, an address of a storage device storing print data and a status of the storage device are displayed as the printable display 2002. When the storage device storing print data in the unprintable job "AAA.txt" is thus written, the user can start an action to make the apparatus with the IP address "192.168.2.11" online.

In FIG. 21C, the unprintable job "AAA.txt" is not displayed on the print job list 2001. When the print job list 2001 is thus configured, the user can select the printable job easily.

In the foregoing description, a print job including print data in an own apparatus and a print job including print data in another apparatus are displayed on the same job list. However, a method for displaying a job list is not limited to this.

As illustrated in FIG. 22, for example, a list of jobs each including print data in an own apparatus may be displayed on a job list screen illustrated in FIG. 22A, and a list of print jobs each including print data in another apparatus may be displayed, as illustrated in FIG. 22B. In such a case, while the printable display 2002 is not required in FIG. 22A, the printable display 2002 may desirably be provided in FIG. 22B because the printable display 2002 differs depending on whether the other apparatus is online or offline.

Through the foregoing processes, the print job list display processing is performed.

Through the processing according to the present exemplary embodiment, the user can easily identify which of the jobs can be printed from the job list, by displaying on a job list jobs that cannot be printed by the image forming apparatus 104.

As described above, through the above-described information processing according to the above-described exemplary embodiments, when a user confirms a print job on an image forming apparatus other than an image formation apparatus storing print jobs, a user can confirm a print job input by the user regardless of a status of the image forming apparatus storing the print jobs.

There can be provided a technique with which an image forming apparatus can notify, when print data of a print job cannot be acquired from another image forming apparatus storing print jobs, a log-in user that the print data cannot be printed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-018131, filed Feb. 2, 2016, which is hereby incorporated by reference herein in its entirety.

What is claimed is:

1. An image forming apparatus capable of communicating with an external apparatus storing first print data, the image forming apparatus comprising:
   a display unit configured to display information;
   a storage unit configured to store second print data;
   an image forming unit configured to form an image on a sheet based on the first print data or the second print data;
   one or more processors; and
   a memory storing executable instructions, which when executed by the one or more processors, cause the image forming apparatus to perform:
      acquiring bibliographic information about a plurality of print data including the first print data and the second print data;
      sending a request to the external apparatus for acquiring status of the external apparatus;
      displaying a screen for selecting print data from among the plurality of print data including the first print data and the second print data on the display unit based on the bibliographic information; and
      causing the image forming unit to form an image based on receiving a printing instruction for the selected print data via the screen,
      wherein information that indicates that the first print data is printable or not printable is displayed on the screen depending on whether or not the status of the external apparatus has been acquired from the external apparatus according to the acquisition request.

2. The image forming apparatus according to claim 1, wherein the information that indicates that the first print data is not printable is information obtained by performing mask processing on an identification information about the first print data.

3. The image forming apparatus according to claim 1, wherein the information that indicates that the first print data is printable is a first icon, and the information that indicates that the first print data is not printable is a second icon.

4. The image forming apparatus according to claim 1, wherein the information that indicates that the first print data is not printable is information indicating that the external apparatus is offline.

5. The image forming apparatus according to claim 1, wherein the bibliographic information about the second print data is acquired from an external apparatus different from the external apparatus.

6. The image forming apparatus according to claim 1, wherein the bibliographic information includes information about a storage destination of the print data.

7. The image forming apparatus according to claim 6, wherein the instructions, when executed by the one or more processors, cause the image forming apparatus to check whether the first print data can be acquired from the external apparatus based on the storage destination information.

8. The image forming apparatus according to claim 7, wherein the first print data and the second print data are associated with the authenticated user.

9. The image forming apparatus according to claim 1, wherein the instructions, when executed by the one or more processors, cause the image forming apparatus to:
   perform authentication to authenticate a user; and
   acquire identification information about print data associated with the authenticated user.

10. The image forming apparatus according to claim 1, wherein the information that indicates that the first print data is printable is displayed on the screen in a case where the status of the external apparatus has been acquired from the external apparatus, and the information that indicates that the first print data is not printable is displayed on the screen in a case where the status of the external apparatus has not been acquired from the external apparatus.

11. The image forming apparatus according to claim 1, wherein the bibliographic information contains at least any of a print job name, a print setting, and a storage location of the first print data.

12. A method for controlling an image forming apparatus capable of communicating with an external apparatus storing first print data, and including a display unit configured to display information, a storage unit configured to store second print data, and an image forming unit configured to form an image on a sheet based on the first print data or the second data, the method comprising:

acquiring bibliographic information about a plurality of print data including the first print data and the second print data;

sending a request to the external apparatus for acquiring status of the external apparatus;

displaying a screen for selecting print data from among the plurality of print data including the first print data and the second print data on the display unit based on the bibliographic information; and causing the image forming unit to form an image based on receiving a printing instruction for the selected print data via the screen, wherein information that indicates that the first print data is printable or not printable is displayed on the screen depending on whether or not the status of the external apparatus has been acquired from the external apparatus according to the acquisition request.

13. A non-transitory storage medium storing a program for causing a computer to execute a method for controlling an image forming apparatus capable of communicating with an external apparatus storing first print data, and including a display unit configured to display information for a user, a storage unit configured to store second print data, and an image forming unit configured to form an image on a sheet based on the first print data or the second data, the method comprising:

acquiring bibliographic information about a plurality of print data including the first print data and the second print data;

sending a request to the external apparatus for acquiring status of the external apparatus;

displaying a screen for selecting print data from among the plurality of print data including the first print data and the second print data on the display unit based on the bibliographic information; and causing the image forming unit to form an image based on receiving a printing instruction for the selected print data via the screen, wherein information that indicates that the first print data is printable or not printable is displayed on the screen depending on whether or not the status of the external apparatus has been acquired from the external apparatus according to the acquisition request.

* * * * *